United States Patent
Maleki et al.

(10) Patent No.: US 7,283,707 B1
(45) Date of Patent: Oct. 16, 2007

(54) EVANESCENTLY COUPLING LIGHT BETWEEN WAVEGUIDES AND WHISPERING-GALLERY MODE OPTICAL RESONATORS

(75) Inventors: Lutfollah Maleki, Pasadena, CA (US); Vladimir S. Iltchenko, La Canada, CA (US)

(73) Assignee: OEwaves, Inc., Pasadena, CA (US)

( * ) Notice: Subject to any disclaimer, the term of this patent is extended or adjusted under 35 U.S.C. 154(b) by 0 days.

(21) Appl. No.: 10/205,054

(22) Filed: Jul. 25, 2002

Related U.S. Application Data

(60) Provisional application No. 60/307,777, filed on Jul. 25, 2001.

(51) Int. Cl.
*G02B 6/26* (2006.01)
*G02B 6/42* (2006.01)

(52) U.S. Cl. .................... 385/39; 385/15; 385/27; 385/30

(58) Field of Classification Search ............. 385/39, 385/37, 31, 14–15, 122, 50, 129, 30, 27
See application file for complete search history.

(56) References Cited

U.S. PATENT DOCUMENTS

| | | | |
|---|---|---|---|
| 5,064,619 A | 11/1991 | Finlan | |
| 5,231,533 A | 7/1993 | Gonokami et al. | |
| 5,351,127 A | 9/1994 | King et al. | |
| 5,532,493 A | 7/1996 | Hale et al. | |
| 5,652,556 A | 7/1997 | Flory et al. | |
| 5,723,856 A | 3/1998 | Yao et al. | |
| 5,777,778 A | 7/1998 | Yao | |
| 5,790,583 A | 8/1998 | Ho | |
| 5,825,799 A | 10/1998 | Ho et al. | |
| 5,915,051 A * | 6/1999 | Damask et al. | 385/16 |
| 5,917,179 A | 6/1999 | Yao | |
| 5,926,496 A | 7/1999 | Ho et al. | |
| 5,929,430 A | 7/1999 | Yao et al. | |
| 6,009,115 A | 12/1999 | Ho | |
| 6,016,197 A | 1/2000 | Krivoshlykov | |
| 6,078,704 A * | 6/2000 | Bischel et al. | 385/4 |
| 6,103,535 A | 8/2000 | Pilevar et al. | |
| 6,138,076 A | 10/2000 | Graf et al. | |
| 6,251,688 B1 | 6/2001 | Erb et al. | |
| 6,278,523 B1 | 8/2001 | Gorecki | |
| 6,389,197 B1 | 5/2002 | Iltchenko et al. | |

(Continued)

FOREIGN PATENT DOCUMENTS

EP    0 533 390 A1    3/1993

(Continued)

OTHER PUBLICATIONS

V.B. Braginsky, M.L. Gorodetsky, and V.S. Ilchenko "Quality-Factor and Nonlinear Properties of Optical Whispering-Gallery Modes," Physics Letters A, vol. 137, No. 7, 8, pp. 393-397 (1989).

(Continued)

*Primary Examiner*—Daniel Hess
*Assistant Examiner*—Edwyn Labaze
(74) *Attorney, Agent, or Firm*—Fish & Richardson P.C.

(57) ABSTRACT

An exemplary embodiment of the present invention described and shown in the specification and drawings is a system including an optical resonator and an optical element having a periodic structure for coupling of light into the optical resonator.

43 Claims, 12 Drawing Sheets

U.S. PATENT DOCUMENTS

| | | |
|---|---|---|
| 6,417,957 B1 | 7/2002 | Yao |
| 6,473,218 B1 | 10/2002 | Maleki et al. |
| 6,473,541 B1* | 10/2002 | Ho .............................. 385/15 |
| 6,476,959 B2 | 11/2002 | Yao |
| 6,487,233 B2 | 11/2002 | Maleki et al. |
| 6,488,861 B2 | 12/2002 | Iltchenko et al. |
| 6,490,039 B2* | 12/2002 | Maleki et al. .............. 356/436 |
| 6,501,879 B1* | 12/2002 | Asseh et al. ................. 385/37 |
| 6,535,328 B2 | 3/2003 | Yao |
| 6,545,791 B1* | 4/2003 | McCaughan et al. ....... 359/245 |
| 6,567,436 B1 | 5/2003 | Yao et al. |
| 6,580,532 B1 | 6/2003 | Yao et al. |
| 6,580,859 B1* | 6/2003 | Maier ......................... 385/122 |
| 6,594,061 B2 | 7/2003 | Huang et al. |
| 6,762,869 B2 | 7/2004 | Maleki et al. |
| 6,771,412 B2* | 8/2004 | Torchigin ................... 359/305 |
| 6,839,491 B2* | 1/2005 | Painter et al. ................ 385/50 |
| 6,865,317 B2* | 3/2005 | Vahala et al. ................ 385/30 |
| 7,120,338 B2* | 10/2006 | Gunn, III .................... 385/50 |
| 2002/0018611 A1 | 2/2002 | Maleki et al. |
| 2002/0041730 A1* | 4/2002 | Sercel et al. ................. 385/30 |
| 2002/0081055 A1* | 6/2002 | Painter et al. ................. 385/2 |
| 2002/0114563 A1* | 8/2002 | Tapalian et al. ............. 385/30 |
| 2003/0012504 A1 | 1/2003 | Iltchenko |
| 2003/0152313 A1* | 8/2003 | Tapalian et al. ............. 385/16 |
| 2005/0147355 A1* | 7/2005 | Ilchenko ..................... 385/50 |
| 2006/0280407 A1* | 12/2006 | Montgomery et al. ........ 385/50 |

FOREIGN PATENT DOCUMENTS

| | | |
|---|---|---|
| WO | WO 01/40757 A2 | 6/2001 |
| WO | WO 01/96913 A1 | 12/2001 |
| WO | WO0196936 | 12/2001 |
| WO | WO 02/13337 A1 | 2/2002 |

OTHER PUBLICATIONS

L. Collot, V. Lefevre-Seguin, M. Brune, J.M. Rainard and S. Haroche "Very High-Q Whispering-Gallery Mode Resonances Observed on Fused Silica Microspheres," Europhysics Letters 23 (5), pp. 327-334 (1993).

V.V. Vassiliev, V.L. Velichansky, V.S. Ilchenko, M.L. Gorodetsky, L. Hollberg, and A.V. Yarovitsky "Narrow-Line-Width Diode Laser with a High-Q Microsphere Resonator," Optics Communications 158, 305-312 (1998).

A.T. Rosenberger and J.P. Rezac "Evanescent-Wave Sensor Using Microsphere Whispering-Gallery Modes," In *Laser Resonators III*, Proceedings of SPIE vol. 3930, pp. 186-192 (2000).

Steve Blair and Yan Chen "Resonant-Enhanced Evanescent-Wave Fluorescence Biosensing with Cylindrical Optical Cavities," *Applied Optics*, vol. 40, No. 4, pp. 570-582, Feb. 1, 2001.

www.technologyreview.com/magazine/sep01/7_oewaves.asp

"OEwaves—Light-wave timekeeper for Faster Networks," by Claire Tristram (Sep. 2001).

* cited by examiner

EVANESCENTLY COUPLING LIGHT BETWEEN WAVEGUIDES AND WHISPERING-GALLERY MODE OPTICAL RESONATORS

CROSS-REFERENCE TO RELATED APPLICATION

The present application claims priority under 35 U.S.C. § 119(e) to U.S. Provisional Application No. 60/307,777, filed on Jul. 25, 2001, which is expressly incorporated by reference as though fully set forth herein.

FIELD OF THE INVENTION

The present invention relates to optical systems, and in particular, to a scheme for coupling light between waveguides and whispering-gallery mode optical resonators.

BACKGROUND OF THE INVENTION

Optical resonators are exemplary electro-optical devices that are often small in size, having diameters on the order of millimeters, and may be used in many optical system applications, including optical sensors for biological and chemical compounds, electro-optical oscillators and modulators, and tunable optical filters. The optical resonators are curved optical waveguides, for example, a cylinder, a sphere, or a toroid within which light is internally reflected at the inner surface of the optical resonator. Optical resonators can support resonator modes of light called whispering-gallery modes ("WGMs"), and thus, are often referred to as whispering-gallery mode resonators. WGMs occur when light having an evanescent wave component travels via internal reflection around the periphery of the optical resonator. The WGMs of optical resonators reside close to the surface of the optical resonator, and undergo total internal reflection. The evanescent waves extend beyond the optical resonator's outer surface and may be coupled into an adjacent optical coupler as long as the optical coupler is located within the extent of the evanescent wave, typically on the order of the light's wavelength.

Many optical resonators which propagate WGMs of light have extremely low transmission losses, and as a result, have a very high quality factor ("Q"). High Q optical resonators are desirable because the higher the Q, the longer the amount of time the internally reflected light will remain within the optical resonator. The ultimate intrinsic Q of the optical resonator ($Q_0$) is limited by the optical losses of the resonator material. Optical resonators having radiuses of 10 to a few hundred micrometers have been produced with Q's in excess of $1 \times 10^9$ (see V. B. Braginsky, M. L. Gorodetsky, V. S. Ilchenko, Phys. Lett. A37, 393 (1989); L. Collot, V. Lefevre-Seguin, M. Brune, J. M. Raimond, S. Haroche, Europhys. Lett. 23, 327 (1993)). In particular, a Q in excess of $1 \times 10^{10}$ was demonstrated for optical resonators, and a Q of $10^{11}$ is expected for glass microsphere optical resonators with a resonant wavelength of light at 1550 nanometers, where the intrinsic loss of glass is a minimum.

Coupling to WGMs of the optical resonator can be accomplished through an evanescent wave from an adjacent optical element, i.e., an optical coupler. If light from the optical coupler is over-coupled to the optical resonator, there will be broadening in the WGM output peak due to increased losses at the interface between the optical coupler and the optical resonator. If light from the optical coupler is under-coupled to the optical resonator, there will be less efficient energy transfer from the optical coupler to the optical resonator. Critical coupling occurs when enough energy is coupled from the optical coupler into the optical resonator to compensate for the roundtrip losses of the light propagating through the optical resonator. Coupling losses between the optical coupler and the optical resonator are exponentially dependent upon the distance d between the surface of the optical coupler and the optical resonator ~exp(−d/r*), where r* is the effective scale length of evanescent field of the resonator for the excited WGM as expressed in the following equation:

$$r^* = \lambda / \sqrt{(4\pi(n_{res}/n_{out})^2 - 1)}$$

where:
  $\lambda$ is the wavelength of light evanescently coupled between the optical coupler and the optical resonator;
  $n_{res}$ is the index of refraction of the optical resonator; and
  $n_{out}$ is the index of refraction outside the surface of the optical resonator.

If the optical coupler contacts the optical resonator, too much of the light is evanescently coupled out from the optical resonator resulting in a low Q. Also, if the optical coupler is positioned far, more than three wavelengths, from the optical resonator, coupling of light between the optical resonator and the optical coupler becomes difficult. Thus, accurate positioning of the optical coupler relative to the optical resonator is critical to the efficiency of the optical system.

Optical couplers can be configured in various forms including those shown by example in FIGS. 1 and 2 which include cross-sectional views, not shown to scale, of two different types of optical couplers 10 and 12. In FIGS. 1 and 2, each optical coupler is positioned adjacent to and spaced away from a cylindrical or spherical optical resonator 16 and 18 by a distance "d", which in practice is roughly on the order of the wavelength of the light to be evanescently coupled into or out from the optical resonator. Typically, d ranges in value from approximately 0.1 to 3 times the wavelength of the light. While not shown in FIGS. 1 and 2, the optical resonator also may be toroidal in shape.

FIG. 1 shows an optical fiber coupler 10 that includes a core 22 and a cladding layer 24. The end of the optical fiber coupler closest to the optical resonator 16 has a flat polished surface 26 through which light is evanescently coupled into and out from the optical resonator. Similarly, FIG. 2 shows a prism coupler 12, which is the traditional method of coupling light into an optical resonator, having a flat surface 28 through which light is evanescently coupled into and out from the optical resonator 18. In FIGS. 1 and 2, incident light travels through the optical coupler as indicated by the straight arrows 30 and 32, respectively, and internally reflected light travels around the periphery of the optical resonator as shown by the curved arrows 34 and 36, respectively.

Because the optical resonator and optical coupler are small in size they may be integrated within small housings or devices that can be incorporated into various optical or electro-optical systems. However, for many applications, especially where on-chip integration is desired, coupling with a prism 12 and the associated lenses (not shown) are not practical, and coupling directly from a waveguide, for example an optical fiber 10, to the optical resonator is desired as shown in FIG. 1 (see V. S. Iltchenko, X. S. Yao, and L. Maleki, Opt. Lett. 24, 723 (1999)).

The basis for optical coupling using a waveguide is in phase matching of the field of the waveguide to the field in the optical resonator's WGM which is accomplished by cutting the waveguide at the angle Φ as shown in FIG. 1. In order to satisfy the phase matching requirement $\Phi=\arcsin(n_{res}/n_{wg})$, where $n_{res}$ is the effective index of refraction for azimuthal propagation of the WGMs as closed waves circulating in a microsphere optical resonator, and $n_{wg}$ is the effective index of refraction for the light guided by the waveguide.

Even though the use of a waveguide to couple light into an optical resonator is advantageous in that it eliminates the need for columnating and focusing optics that is commonly required for prism couplers, the precision cut of the waveguide to create the required angle is difficult to implement. This is especially true in the case of semiconductor waveguides where efficient growth and the cleave angle relate to the orientation of the waveguide material. In addition, the above mentioned angle phase matching scheme is not suitable for cases in which the indices of refraction of the waveguide and the optical resonator are significantly different, for example, when the waveguide is a silicon optical fiber having a core index of refraction of 1.46 and the optical resonator is made of lithium niobate having an index of refraction of 2.06.

Therefore, there is a need for an optical coupler for coupling evanescent waves into and out of optical resonators that does not require the precise angle cut of the waveguide. Also, there is a need for an optical coupler that can couple evanescent waves even though the indices of refraction of the waveguide and the optical resonator are significantly different.

SUMMARY OF THE INVENTION

In one aspect of the present invention, a system includes an optical resonator and an optical element having a periodic structure for coupling of light into the optical resonator.

In another aspect of the present invention, a method for coupling light, the method including propagating light through an optical element having a periodic structure, where the light interacts with the periodic structure, and coupling the light from the optical element into an optical resonator.

It is understood that other aspects of the present invention will become readily apparent to those skilled in the art from the following detailed description, wherein is shown and described only exemplary embodiments of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Various features, aspects, and advantages of the present invention will become better understood with regard to the following description, appended claims, and accompanying drawings where:

DETAILED DESCRIPTION OF THE PREFERRED EMBODIMENTS

The present invention involves optical systems in which light is coupled into an optical resonator by means of an optical element having a periodic structure. The periodic structure facilitates the coupling of light from the optical element into the optical resonator. One embodiment of the present invention is a system that includes an optical resonator and a waveguide. The waveguide has a periodic structure adjacent to the optical resonator. Light propagates through the waveguide, interacts with the periodic structure, and couples from the waveguide into the optical resonator.

Another embodiment of the present invention is a system that includes an optical resonator and an optical coupler. The optical coupler has an optical coupler surface with a periodic structure located adjacent to the optical resonator. Light propagates through the optical coupler, interacts with the periodic structure, and couples from the optical coupler into the optical resonator.

Another embodiment of the present invention is a system that includes an optical resonator, a waveguide, and a photonic bandgap crystal. The photonic bandgap crystal is positioned between the waveguide and the optical resonator. Light couples from the waveguide, through the photonic bandgap crystal, and into the optical resonator.

Another embodiment of the present invention is a system that includes a first optical resonator having a periodic structure and a second optical resonator located adjacent to the periodic structure of the first optical resonator. Light propagates through an input optical coupler, couples from the input optical coupler into the first optical resonator, propagates through the first optical resonator, interacts with the periodic structure of the first optical resonator, couples from the first optical resonator into a second optical resonator, and propagates through the second optical resonator.

Another embodiment of the present invention is a system that includes a first optical resonator, a second optical resonator, and a photonic bandgap crystal. The second optical resonator is located adjacent to the first optical resonator. The photonic bandgap crystal is positioned between the first optical resonator and the second optical resonator. Light couples from the first optical resonator, through the photonic bandgap crystal, and into the second optical resonator.

Figure 3:
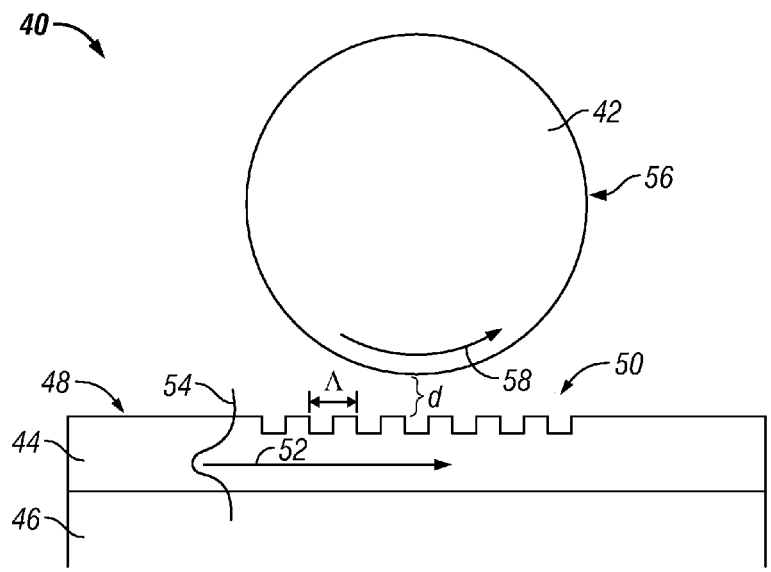
FIG. 3 is a cross-sectional view of a waveguide having a periodic structure and spherical optical resonator in accordance with an exemplary embodiment of the present invention.

FIG. 3 is a cross-sectional view, not shown to scale, of one exemplary embodiment of the present invention that includes an optical system 40 having a spherical optical resonator 42 and a waveguide 44 that are physically separated by a distance "d". While the optical resonator and waveguide can be made from various materials, in the present embodiment, the optical resonator is made of fused silica having an index of refraction of approximately 1.46. Also, the waveguide in the present embodiment is made of Gallium Arsenide (GaAs) and has an index of refraction of 3.5. The waveguide is formed in a supporting substrate 46 made of Aluminum Gallium Arsenide (AlGaAs), that has an index of refraction less than the index of refraction of the waveguide material. The top surface 48 of the waveguide has been grated to form a periodic structure 50.

In operation, as shown in FIG. 3, light to be evanescently coupled from the waveguide 44 into the optical resonator 42 propagates along the optical axis of the waveguide in the direction of the straight arrow 52. FIG. 3 includes a curved profile 54 that indicates the amplitude of the light wave including the evanescent component extending above the waveguide's top surface 48 as the light propagates along the optical axis of the waveguide. The light interacts with the periodic structure 50 of the waveguide resulting in an enhanced evanescent component of the light that extends away from the top surface of the waveguide. Next, the evanescent component of the light is coupled into the optical resonator. The light is then internally reflected at the surface 56 of the optical resonator as it propagates through the optical resonator near its outer surface as indicated by the curved arrow 58. Thus, the periodic structure assists in creating the quasi-phase matching that is required for optical coupling of the light from the waveguide into the optical resonator.

The period of grating "$\Lambda$" of the periodic structure 50 is chosen so that $2\pi/\Lambda$ fills the gap between the wavevectors of the modes to be phase-matched. Thus, $\Lambda = \lambda / |n_{wg} - n_{res}|$, where $n_{wg}$ is the index of refraction for the waveguide 44 and $n_{res}$ is the index of refraction for the optical resonator 42.

Optical coupling of evanescent fields from the waveguide 44 into the optical resonator 42 in FIG. 3 has a low efficiency due to the low amplitude of the evanescent field between the top surface 48 of the waveguide and the optical resonator as indicated in the curved profile 54 of the light's amplitude. Because of the reduced amplitude of the evanescent field between the top surface of the waveguide and the optical resonator, the optical system 40 will only resonate when the optical resonator has a sufficiently high Q.

Figure 4:
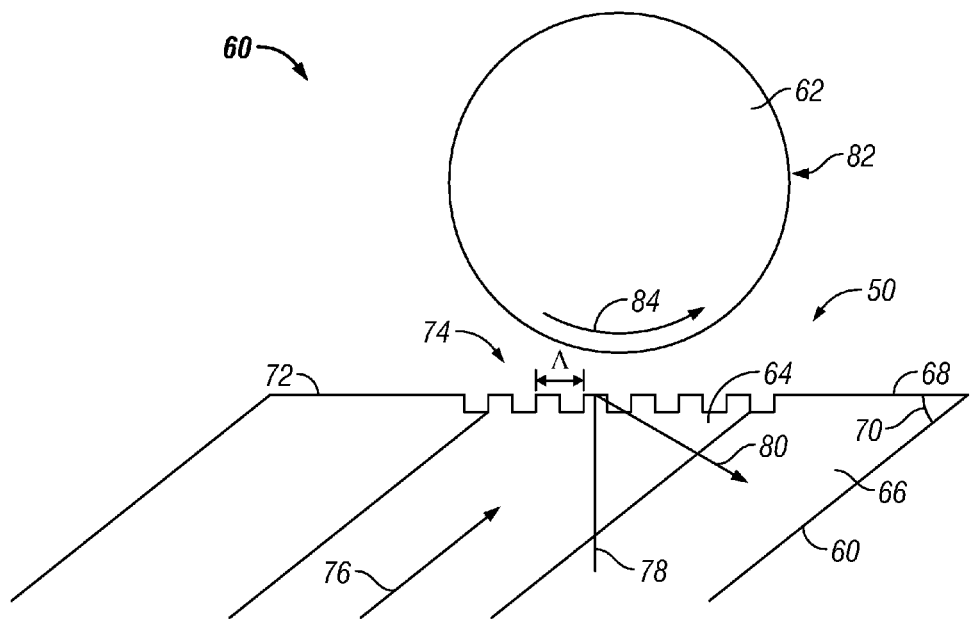
FIG. 4 is a cross-sectional view of an optical fiber coupler having a periodic structure and a spherical optical resonator in accordance with an exemplary embodiment of the present invention.

FIG. 4 is a cross-sectional view, not shown to scale, of another exemplary embodiment of the present invention that includes an optical system 60 having an optical fiber coupler 60 and a spherical optical resonator 62. While the optical resonator and optical fiber coupler can be made from various materials, in the present embodiment is made of lithium niobate having an index of refraction of 2.08. Also, the optical fiber coupler, for example, is SMF-28 manufactured by Corning Incorporated of Corning, N.Y., and includes both a core 64, for example, made of germanium-doped fused silica, having an index of refraction of approximately 1.468 at a wavelength of 1550 nanometers and a cladding layer 66, for example, made of fused silica, having an index of refraction of approximately 0.36% less than the core.

As shown in FIG. 4, the end 68 of the optical fiber coupler 60 closest to the optical resonator 62 has been ground to an acute angle 70 of approximately 10° and then polished resulting in a coupler surface 72. As a result of the acute angle, the length of the coupler surface is approximately 1 millimeter even though the outside diameter of the optical fiber coupler is merely 125 micrometers. The coupler surface of the optical fiber coupler has been grated to form a periodic structure 74 that extends across the exposed portion of the core 64.

In operation, as shown in FIG. 4, light to be evanescently coupled from the optical fiber coupler 60 into the optical resonator 62 propagates along the optical axis of the core 64, in the direction of the straight arrow 76, until the light encounters the coupler surface 72, at which point, the light is total internally reflected relative to a perpendicular 78 to the coupler surface as indicated by the arrow 80. Because of the total internal reflection, an evanescent component of the light evanescently penetrates beyond the coupler surface and extends toward the optical resonator. The light also interacts with the periodic structure 74 of the coupler surface resulting in an enhanced evanescent component of the light that extends further away from the coupler surface. Next, the evanescent component of the light is coupled into the optical resonator. The light is then internally reflected at the surface 82 of the optical resonator as it propagates through the optical resonator near its outer surface as indicated by the curved arrow 84. As in the embodiment of FIG. 3, the periodic structure assists in creating the quasi-phase matching that is required for optical coupling of the light from the optical fiber coupler into the optical resonator.

Because the light undergoes total internal reflection at the coupler surface 72, the evanescent component of the light has an amplitude greater than the amplitude of the evanescent component of the light in the embodiment of FIG. 3. Thus, in the embodiment of FIG. 4, critical coupling between the optical fiber coupler 60 and the optical resonator 62 can be obtained with a lower-Q resonator material, for example, an optical resonator made of lithium niobate.

Similar to the embodiment of FIG. 3, the period of grating "Λ" of the periodic structure 74 is chosen so that $\Lambda = \lambda/|n_{wg} \sin \Phi - n_{res}|$, where $n_{wg}$ is the index of refraction for the waveguide, $\Phi$ is the angle between the perpendicular 78 to the coupler surface 72 and the core's 64 optical axis represented by arrow 76, and $n_{res}$ is the index of refraction for the optical resonator 62. The use of the periodic structure on the coupler surface assists in optical coupling between the optical fiber coupler 60 and the optical resonator even when the optical coupler fiber and the optical resonator are formed out of different materials having disparate indexes of refraction, e.g., silica and lithium niobate.

Figure 5:
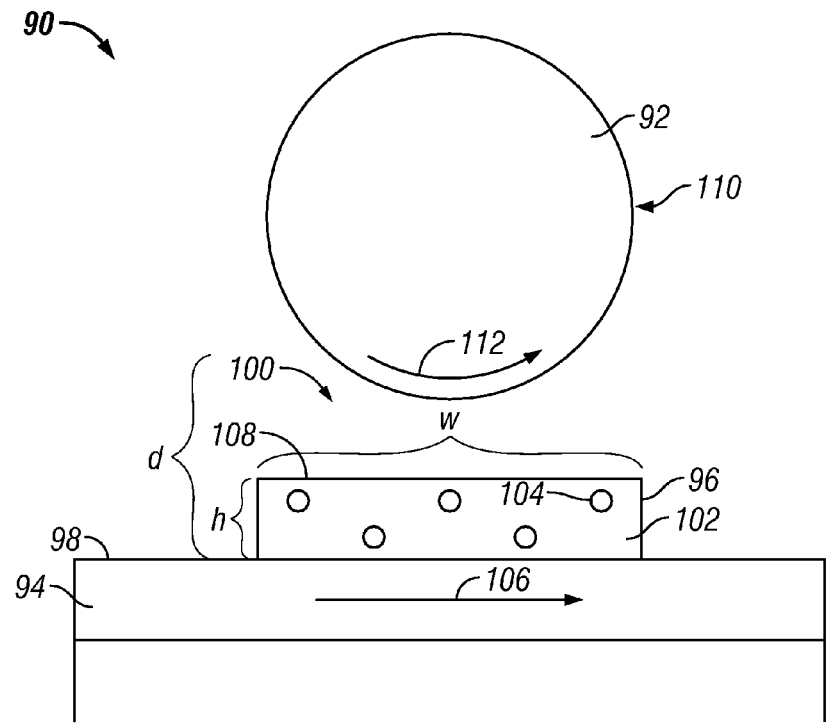
FIG. 5 is a cross-sectional view of a waveguide, photonic bandgap crystal, and spherical optical resonator in accordance with an exemplary embodiment of the present invention.

FIG. 5 is a cross-sectional view, not shown to scale, of another exemplary embodiment of the present invention similar to the exemplary embodiment shown in FIG. 3 that includes an optical system 90 having a spherical optical resonator 92 and a waveguide 94 that are physically separated by a distance "d". However, the exemplary embodiment of FIG. 5 includes a photonic bandgap crystal 96 (see J. D. Joannopoulos, R. D. Meade, and N. J. Winn, *Photonic Crystals: Modeling the Flow of Light* (Princeton U. Press, N.J. 1005)) positioned between the waveguide and the optical resonator. As shown in FIG. 5, the photonic bandgap crystal is positioned in contact with the top surface 98 of the waveguide and since the height "h" of the photonic bandgap crystal is less than the distance "d", a gap 100 is shown between the photonic bandgap crystal and the optical resonator. The photonic bandgap crystal has a width "w" that need not extend beyond the optical resonator adjacent to the photonic bandgap crystal.

A photonic bandgap crystal 96 is a periodic structure made up of a slab of material 102 either fabricated with holes 104 or through which holes are bored. Photonic bandgap crystals have the property of supporting propagation of optical fields having specific wavelengths and directivity (k-vector), and as such, has been used to construct optical filters and cavities. The configuration of the holes determines the frequency characteristics of the photonic bandgap crystal. The photonic bandgap crystals can be formed from a variety of materials including semiconductor materials, and thus, the photonic bandgap crystals can be formed using epitaxy or etching techniques. In particular, photonic bandgap crystals may be formed from silicon, indium phosphate, and acrylic.

In operation, light to be evanescently coupled from the waveguide 94 into the optical resonator 92 propagates along the optical axis of the waveguide in the direction of the straight arrow 106. The evanescent portion of the light extends beyond the waveguide's top surface 98 as the light propagates along the optical axis of the waveguide. The evanescent portion of the light optically tunnels the photonic bandgap crystal 96 and extends above the top surface 108 of the photonic bandgap crystal. Next, the evanescent component of the light is coupled into the optical resonator. The light is then internally reflected at the surface 110 of the optical resonator as it propagates through the optical resonator near its outer surface as indicated by the curved arrow 112. The periodic structure of the photonic bandgap crystal assists in creating the quasi-phase matching that is required for optical coupling of the light from the waveguide into the optical resonator. Thus, the photonic bandgap crystal is used as an intermediary element between the waveguide and the optical resonator to phase couple the evanescent component of the light from the waveguide into the optical resonator.

Figure 6:
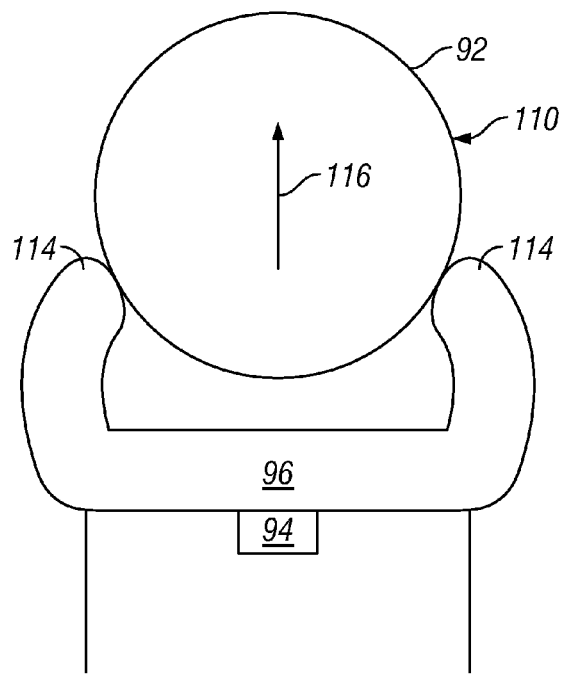
FIG. 6 is a cross-sectional view of a waveguide, photonic bandgap crystal having extensions, and spherical optical resonator in accordance with an exemplary embodiment of the present invention.

FIG. 6 illustrates a cross-sectional view, not shown to scale, of an exemplary embodiment of the present invention taken perpendicular to the view of FIG. 5. In the exemplary embodiment of FIG. 6, the photonic bandgap crystal 96 is fabricated with extensions 114 that make mechanical contact with the outside surface 110 of the optical resonator 92. The extensions contact the optical resonator at points on the outside surface away from the plane in which the light propagates through the optical resonator as indicated by the vertical arrow 116. The mechanical interface provided by the photonic bandgap crystal's extensions allows for optical systems 90 like the one illustrated in FIG. 5 where a gap 100 exists between the optical resonator and the photonic bandgap crystal.

Figure 7:
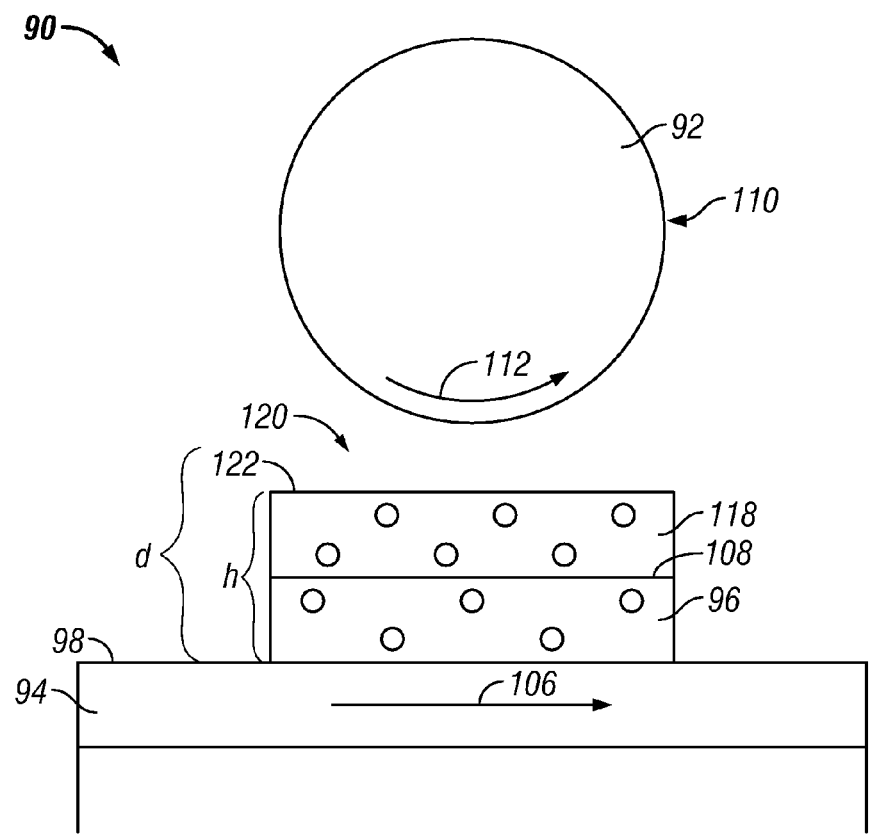
FIG. 7 is a cross-sectional view of a waveguide, two photonic bandgap crystals, and a spherical optical resonator in accordance with an exemplary embodiment of the present invention.

FIG. 7 is a cross-sectional view, not shown to scale, of an embodiment of the present invention similar to the embodiment of FIG. 5 with the added feature of having a second photonic bandgap crystal 118 located between the first photonic bandgap crystal 96 and the optical resonator 92. As shown in FIG. 7, the first photonic bandgap crystal is positioned in contact with the top surface 98 of the waveguide 94. The second photonic bandgap crystal is positioned in contact with the top surface 108 of the first photonic bandgap crystal. Since the combined height "h" of the first and second photonic bandgap crystals is less than the distance "d", a gap 120 is shown between the second photonic bandgap crystal and the optical resonator.

In operation, similar to the embodiment of FIG. 5, light to be evanescently coupled from the waveguide 94 into the optical resonator 92 propagates along the optical axis of the waveguide in the direction of the straight arrow 106. The evanescent component of the light extends beyond the waveguide's top surface 98 as the light propagates along the optical axis of the waveguide. The evanescent component of the light optically tunnels through the first photonic bandgap crystal 96 and then through the second photonic bandgap crystal 118 and extends above the top surface 122 of the second photonic bandgap crystal. Next, the evanescent component of the light is coupled into the optical resonator. The light is then internally reflected at the surface 110 of the optical resonator as it propagates through the optical resonator near its outer surface as indicated by the curved arrow 112.

In the exemplary embodiment of FIG. 7, the periodic structures of both the first and second photonic bandgap crystals 96 and 118, respectively, assists in creating the quasi-phase matching that is required for optical coupling of the light from the waveguide 94 into the optical resonator 92.

As was the case in the exemplary embodiment of FIG. 6, the exemplary embodiment of FIG. 7 can be modified so that either the first or second photonic bandgap crystal 96 and 118, respectively, or both, include extensions (not shown) that contact the optical resonator 92 at points on the outside surface 110 away from the plane in which the light internally reflects around the optical resonator. Additional embodiments of the present invention with or without extensions, while not shown, include more than two photonic bandgap crystals.

Figure 1:
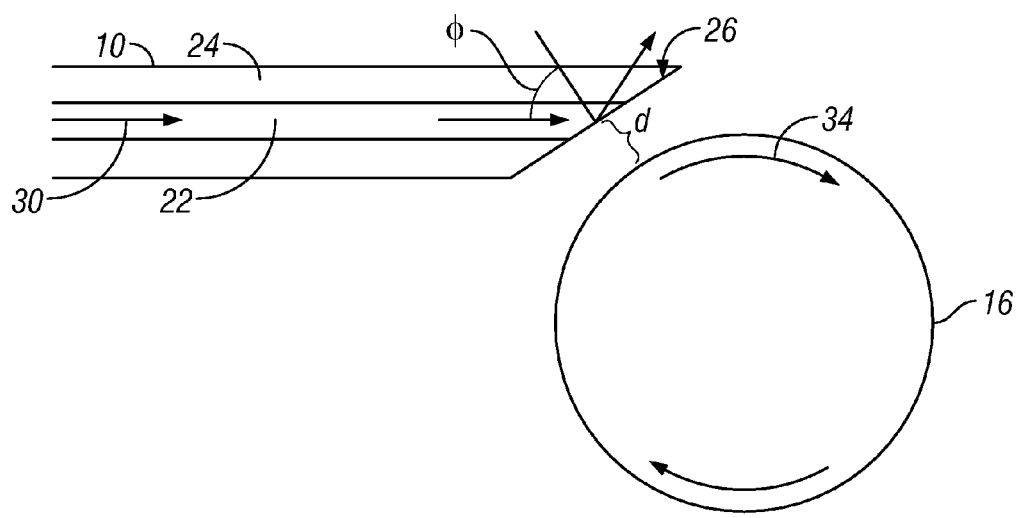
FIG. 1 is a cross-sectional view of an optical fiber coupler and spherical optical resonator.
Figure 2:
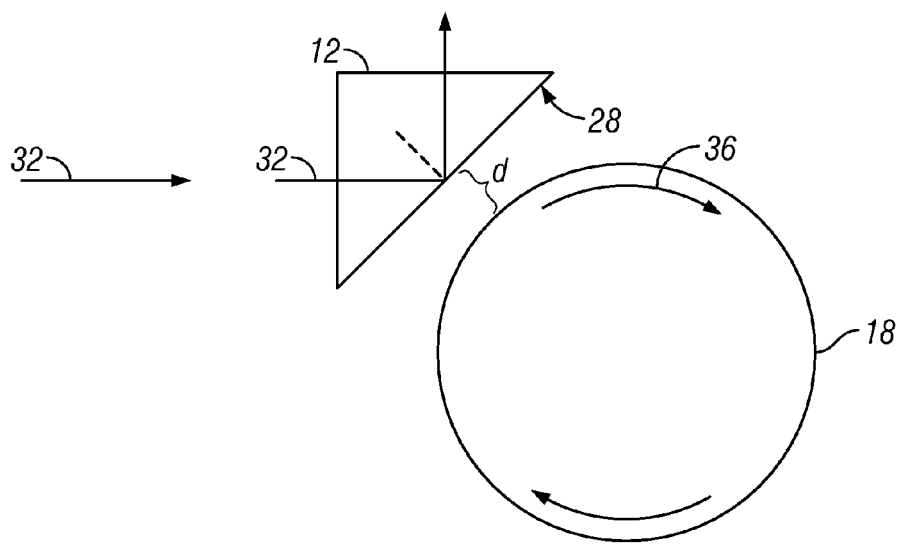
FIG. 2 is a cross-sectional view of a prism coupler and spherical optical resonator.
Figure 8:
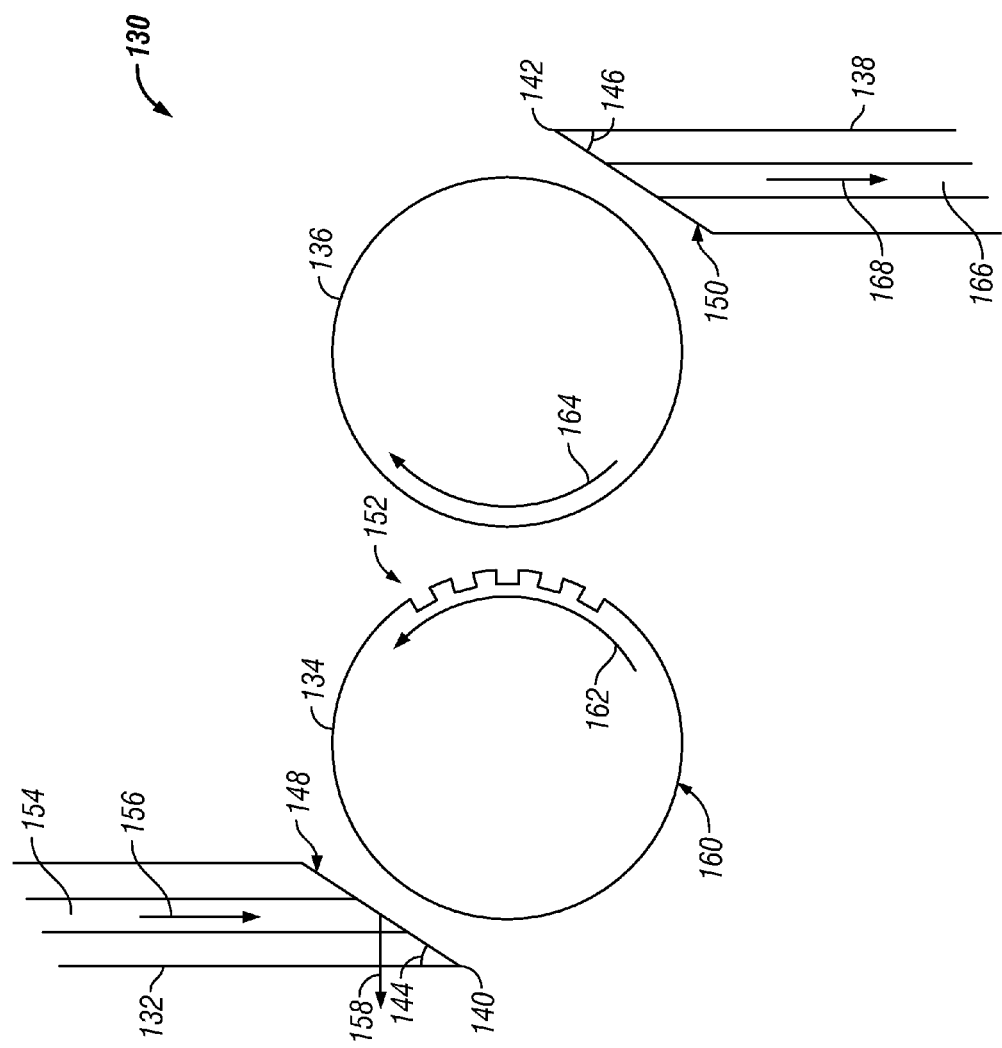
FIG. 8 is a cross-sectional view of an input optical fiber coupler, a first optical resonator having a periodic structure, a second optical resonator, and an output optical fiber coupler in accordance with an exemplary embodiment of the present invention.

FIG. 8 is a cross-sectional view, not shown to scale, of another exemplary embodiment of an optical system 130 according to the present invention having an input optical fiber coupler 132, a first spherical optical resonator 134, a second spherical optical resonator 136, and an output optical fiber coupler 138. Both the input optical coupler and the output coupler similar to the optical couplers of FIG. 1 and FIG. 4 include ends 140 and 142, respectively, closest to the corresponding optical resonators 134 and 136 respectively, that have been ground to an acute angle 144 and 146, respectively, and then polished resulting in an input coupler surface 148 and an output coupler surface 150.

The input coupler surface 148 is positioned adjacent to the first optical resonator 134 which on the side opposing the input coupler surface has been grated to form a periodic structure 152. The second optical resonator 136 is located adjacent to the periodic structure of the first optical resonator. The output coupler surface 150 is positioned adjacent to side of the second optical resonator and away from the first optical resonator.

In operation, as shown in FIG. 8, light to be evanescently coupled from the input optical fiber coupler 132 into the first optical resonator 134 propagates along the optical axis of the input optical fiber coupler's core 154, in the direction of the straight arrow 156, until the light encounters the input coupler surface 148, at which point, the light is total internally reflected relative to a perpendicular to the input coupler surface as indicated by the arrow 158. Because of the total internal reflection, an evanescent component of the light extends beyond the input coupler surface toward the first optical resonator. If the input coupler surface includes a periodic structure (not shown), then the light also interacts with the periodic structure of the input coupler surface resulting in an enhanced evanescent component of the light that extends further away from the input coupler surface.

The evanescent component of the light is coupled into the first optical resonator 134. The light is then internally reflected at the surface 160 of the first optical resonator as it propagates through the first optical resonator near its outer surface as indicated by the curved arrow 162. The light as it propagates through the first optical resonator interacts with the periodic structure 152 of the first optical resonator resulting in an enhanced evanescent component of the light that extends away from the surface of the first optical resonator.

Next, the evanescent component of the light is coupled into the second optical resonator 136 and the light, as occurred in the first optical resonator 134, is internally reflected at the surface of the second optical resonator as it propagates through the second optical resonator as shown by the curved arrow 164. The evanescent component of the light is then coupled from the second optical resonator into the output optical fiber 138 and propagates along the optical axis of the output optical fiber coupler's core 166, in the direction of the straight arrow 168. In this manner, light is coupled from the input optical fiber coupler 132 through the first and second optical resonators and into the output optical fiber coupler.

While not shown in FIG. 8, embodiments of the present invention may include a second optical resonator 136 grated with a periodic structure (not shown) similar to the first optical resonator's periodic structure 152 adjacent to the output coupler surface 150. The second optical resonator's periodic structure would assist in the coupling of the evanescent component of light between the second optical resonator and the output optical fiber coupler 138, especially in the instance where the second optical resonator and the output optical fiber coupler are made of materials having disparate indexes of refraction.

Figure 9:
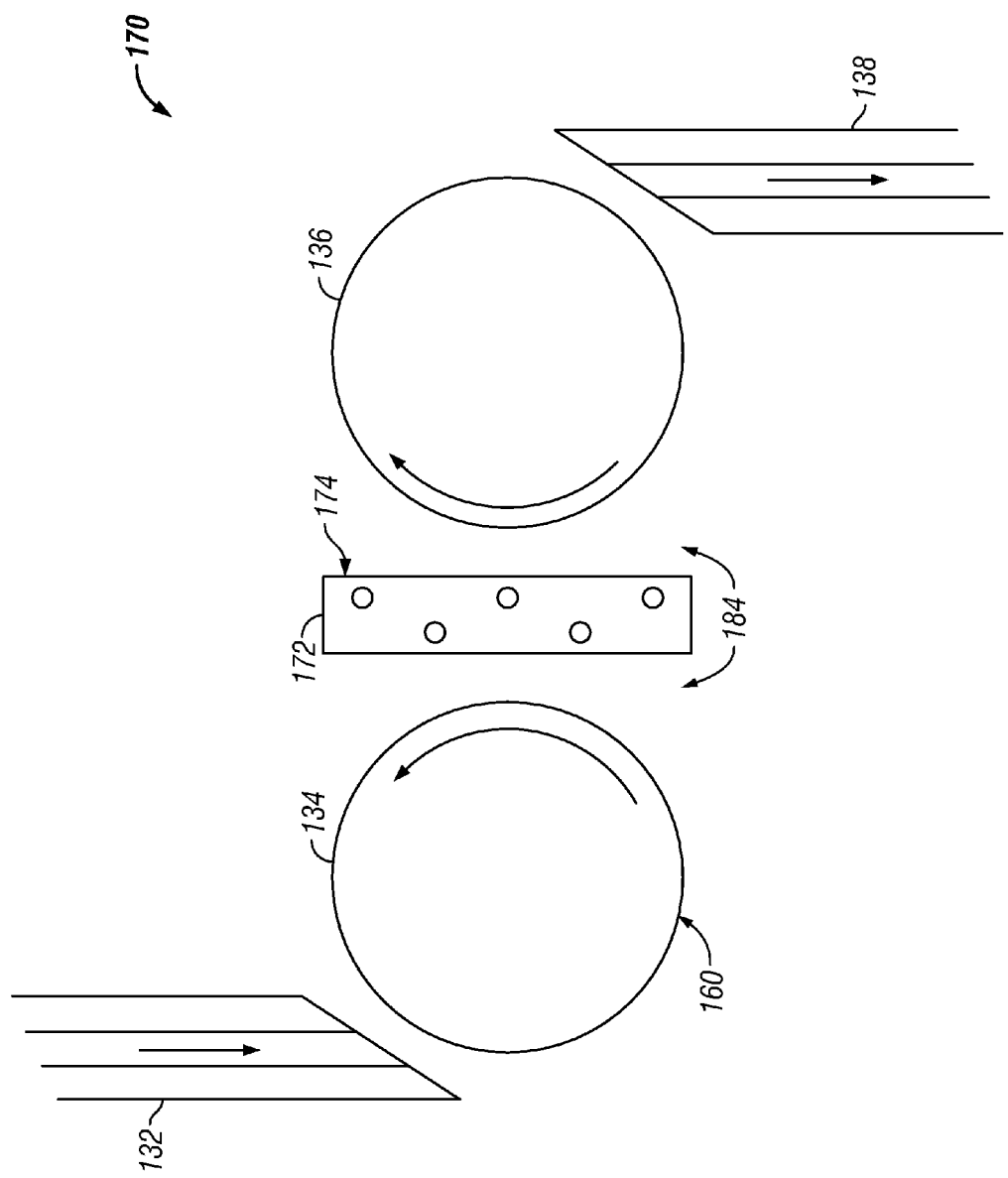
FIG. 9 is a cross-sectional view of an input optical fiber coupler, a first optical resonator, a photonic bandgap crystal, a second optical resonator, and an output optical fiber coupler in accordance with an exemplary embodiment of the present invention.

FIG. 9 is a cross-sectional view, not shown to scale, of another exemplary embodiment of an optical system 170 of the present invention. Similar to the exemplary embodiment of FIG. 8, the exemplary embodiment of FIG. 9 includes an input optical fiber coupler 132, a first spherical optical resonator 134, a second spherical optical resonator 136, and an output optical fiber coupler 138. However, the first optical resonator does not have a periodic structure 152 grated into it surface 160. Rather, a photonic bandgap crystal 172, as discussed in the exemplary embodiment of FIG. 5 is located between the first optical resonator and the second optical resonator without making contact with either the first optical resonator or the second optical resonator.

The mode of operation of the exemplary embodiment illustrated in FIG. 9 is similar to that of the exemplary embodiment of FIG. 8 with the following difference. Instead of the light interacting with a periodic structure 152, the light is merely internally reflected at the surface 160 of the first optical resonator 134 generating an evanescent component of the light that extends away from the surface of the first optical resonator. The evanescent component of the light optically tunnels through the photonic bandgap crystal 172 and extends beyond the surface 174 of the photonic bandgap crystal adjacent to the second optical resonator 136 where it is coupled into the second optical resonator. Thus, the photonic bandgap crystal is used an intermediary element between the first and second optical resonators.

Figure 10:
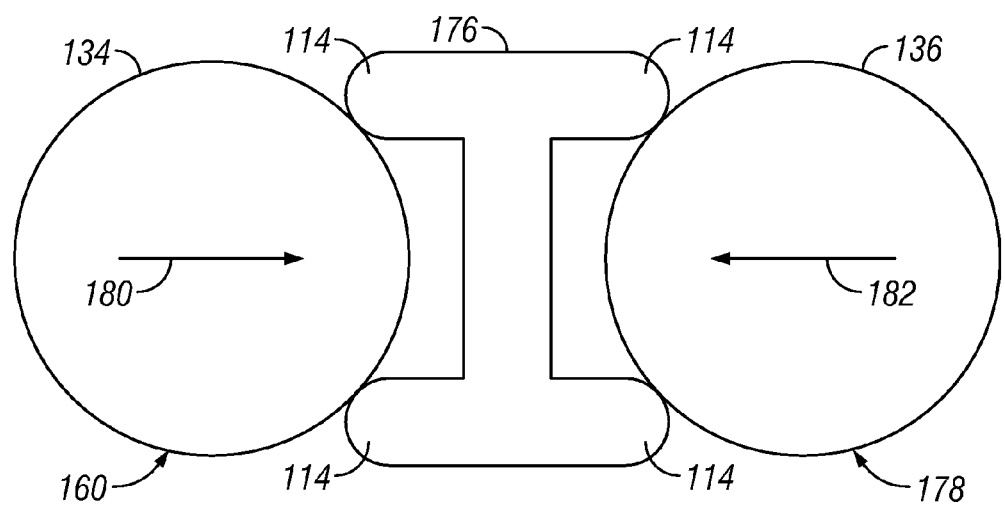
FIG. 10 is a cross-sectional view of a first optical resonator, a photonic bandgap crystal having extensions, and a second optical resonator in accordance with an exemplary embodiment of the present invention.

FIG. 10 is a cross-sectional view, not shown to scale, of another exemplary embodiment of the present invention taken perpendicular to the view of FIG. 9 which, similar to the exemplary embodiment of FIG. 6, shows the photonic bandgap crystal 176 fabricated with extensions 114 that make mechanical contact with the outside surfaces 160 and 178, respectively, of both the first and second optical resonators 134 and 136, respectively. The extensions contact the first and second optical resonators at points on their outside surface away from the plane in which the light propagates through the first and second optical resonators as indicated by the horizontal arrows 180 and 182, respectively. The mechanical interface provided by the photonic bandgap crystal's extensions allows for optical systems 170 like the one illustrated in FIG. 9 where a gap 184 exists between the photonic bandgap crystal and both the first and second optical resonators.

Figure 11:
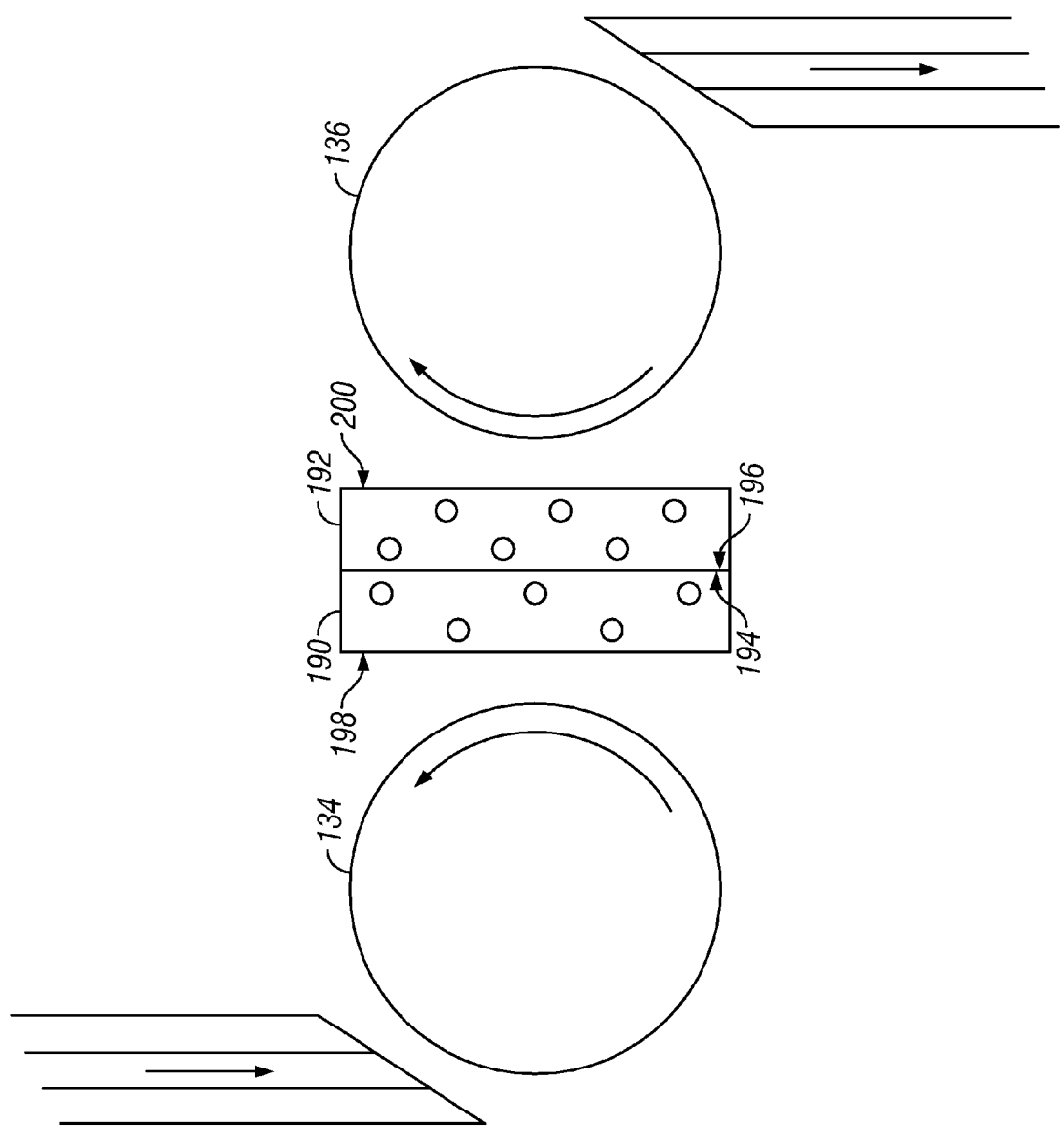
FIG. 11 is a cross-sectional view of an input optical fiber coupler, a first optical resonator, a first photonic bandgap crystal, a second photonic bandgap crystal, a second optical resonator, and an output optical fiber coupler in accordance with an exemplary embodiment of the present invention.

FIG. 11 is a cross-sectional view, not shown to scale, of another exemplary embodiment of the present invention. The exemplary embodiment illustrated in FIG. 11 is similar to that of FIG. 9, however, instead of having only one photonic bandgap crystal 172, there is a first photonic bandgap crystal 190 and a second photonic bandgap crystal 192. One surface 194 of the first photonic bandgap crystal is in contact with a surface 196 of the second photonic bandgap crystal. The opposing surface 198 of the first photonic bandgap crystal is adjacent to the first optical resonator 134 and opposing surface 200 of the second photonic bandgap crystal is adjacent to the second optical resonator 136.

The mode of operation of the exemplary embodiment of FIG. 11 is similar to that of the exemplary embodiment of FIG. 9 with the following difference. Instead of the evanescent component of the light optically tunneling through merely one photonic bandgap crystal 172, the evanescent component optically tunnels through the first photonic bandgap crystal 190 and then the second photonic bandgap crystal 192. After optically tunneling through the second photonic bandgap crystal, the evanescent component of the light extends beyond the surface 200 of the second photonic bandgap crystal adjacent to the second optical resonator 136 where it is coupled into the second optical resonator. Additional embodiments of the present invention, while not shown, include more than two photonic bandgap crystals.

Figure 12:
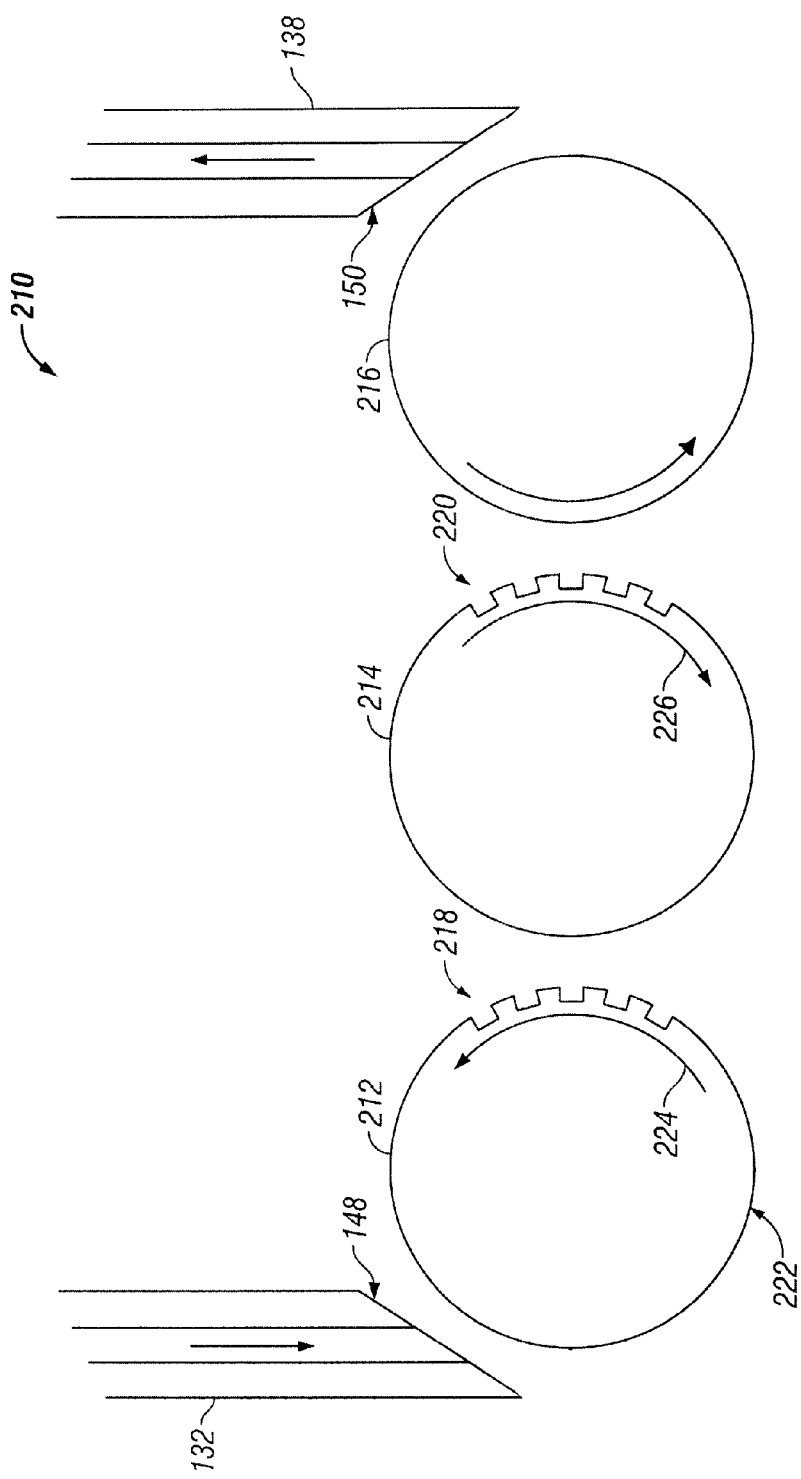
FIG. 12 is a cross-sectional view of an input optical fiber coupler, a first optical resonator having a periodic structure, a second optical resonator having a periodic structure, a third optical resonator, and an output optical fiber coupler in accordance with an exemplary embodiment of the present invention.

FIG. 12 is a cross-sectional view, not shown to scale, of another optical system 210 according to an exemplary embodiment of the present invention. The exemplary embodiment of FIG. 12 is similar to the exemplary embodiment of FIG. 8 with the added difference that instead of having two optical resonators 134 and 136, the embodiment of FIG. 12 includes a first optical resonator 212, a second optical resonator 214, and a third optical resonator 216 located between the input optical fiber coupler 134 and the output optical fiber coupler 138.

The input coupler surface 148 is positioned adjacent to the first optical resonator 212 which on the opposing side has been grated to form a periodic structure 218. The second optical resonator 214 is located adjacent to the periodic structure of the first optical resonator. The opposing side of the second optical resonator has been grated to form a periodic structure 220. The third optical resonator 216 is located between the second optical resonator's periodic structure and the output fiber coupler 138.

The operation of the exemplary embodiment of FIG. 12 is similar to the exemplary embodiment of FIG. 8, except for the following differences. The light that is reflected at the surface 222 of the first optical resonator 212 as it propagates through the first optical resonator near its outer surface as indicated by the curved arrow 224 interacts with the periodic structure 218 of the first optical resonator resulting in an enhanced evanescent component of the light that extends away from the surface of the first optical resonator. The evanescent component of the light is coupled into the second optical resonator 214 and the light, as occurred in the first optical resonator, is internally reflected at the surface 226 of the second optical resonator as it propagates through the second optical resonator and interacts with the periodic structure 220 of the second optical resonator resulting in an enhanced evanescent component of light that extends away from the surface of the second optical resonator. The evanescent component of the light is then coupled from the second optical resonator into the third optical resonator 216 where it is internally reflected as it propagates through the third optical resonator. Finally, the evanescent component of the light is coupled into the output fiber coupler 138.

While not shown in FIG. 12, embodiments of the present invention may include a third optical resonator 216 grated with a periodic structure (not shown) similar to the first and second optical resonator's periodic structures 218 and 220, respectively, adjacent to the output coupler surface 150. The third optical resonator's periodic structure would assist in the coupling of the evanescent component of light between the second optical resonator 214 and the output optical fiber coupler 138, especially in the instance where the third optical resonator and the output optical fiber coupler are made of materials having disparate indexes of refraction.

Figure 13:
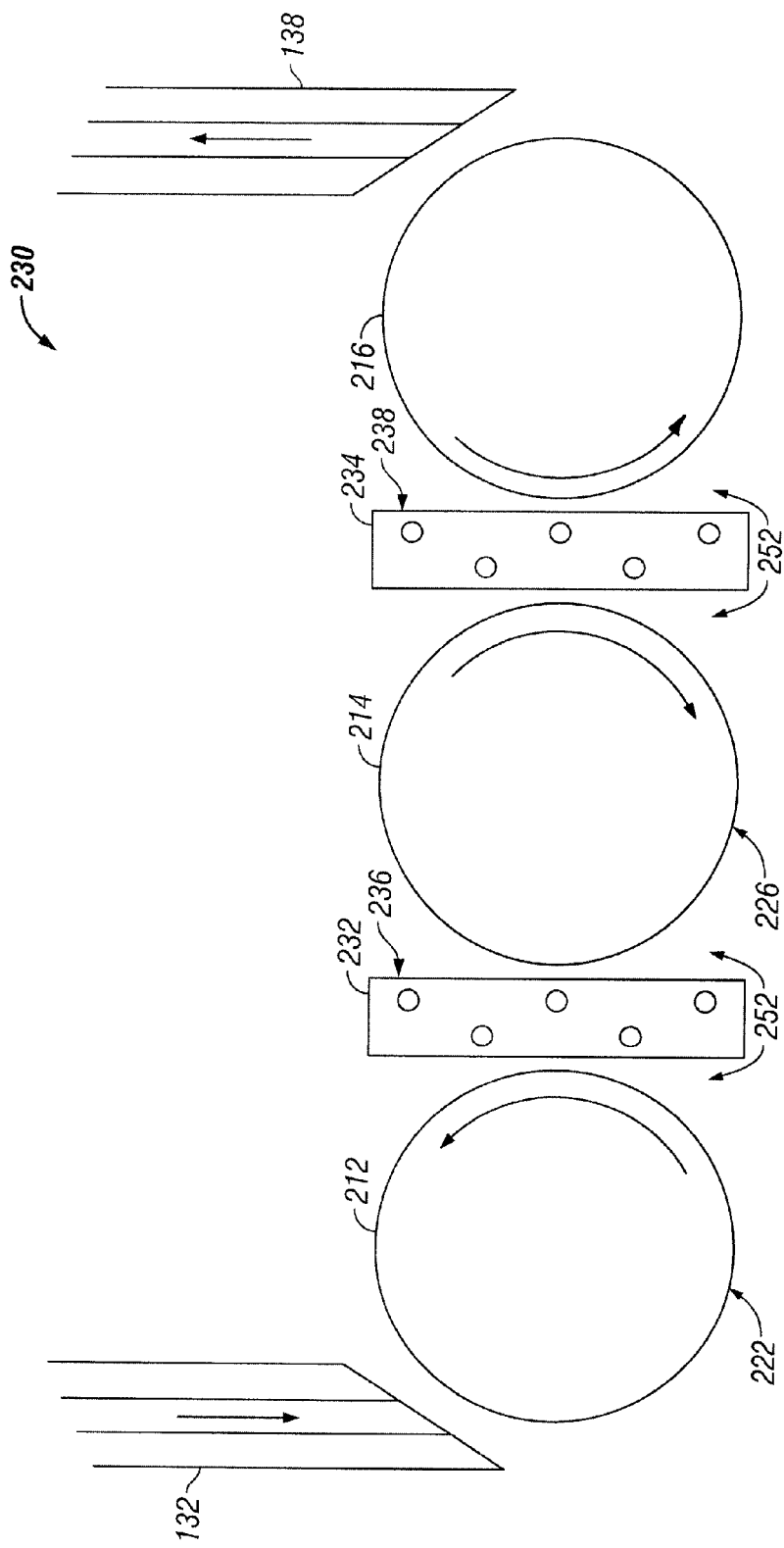
FIG. 13 is a cross-sectional view of an input optical fiber coupler, a first optical resonator, a first photonic bandgap crystal, a second optical resonator, a second photonic bandgap crystal, a third optical resonator, and an output optical fiber coupler in accordance with an exemplary embodiment of the present invention.

FIG. 13 is a cross-sectional view, not shown to scale, of another optical system 230 according to an exemplary embodiment of the present invention. Similar to the exemplary embodiment of FIG. 12, the exemplary embodiment of FIG. 13 includes an input optical fiber coupler 132, a first optical resonator 212, a second optical resonator 214, a third optical resonator 216, and an output optical fiber coupler 138. However, the first and second optical resonators do not have periodic structures 218 and 220, respectively, grated into their surfaces 222 and 226, respectively. Rather, a first photonic bandgap crystal 232 is located between the first optical resonator and the second optical resonator and a second photonic bandgap crystal 234 is located between the second optical resonator and the third optical resonator. Neither the first or second photonic bandgap crystals make contact with either the first, second, or third optical resonators.

The mode of operation of the exemplary embodiment illustrated in FIG. 13 is similar to that of the exemplary embodiment of FIG. 12 with the following difference. Instead of the light interacting with a periodic structure 218 and 220, the light is merely internally reflected at the surface 222 of the first optical resonator 212 generating an evanescent component of the light that extends away from the surface of the first optical resonator. The evanescent component of the light optically tunnels through the first photonic bandgap crystal 232 and extends beyond the surface 236 of the first photonic bandgap crystal adjacent to the second optical resonator 214 where it is coupled into the second optical resonator. The light is internally reflected at the surface 226 of the second optical resonator generating an evanescent component of the light that extends away from the surface of the second optical resonator. The evanescent wave optically tunnels through the second photonic bandgap crystal 234 and extends beyond the surface 238 of the second photonic bandgap crystal adjacent to the third optical resonator 216 where it is coupled into the third optical resonator. Thus, the first and second photonic bandgap crystals are used as intermediary elements between the first, second, and third optical resonators.

Figure 14:
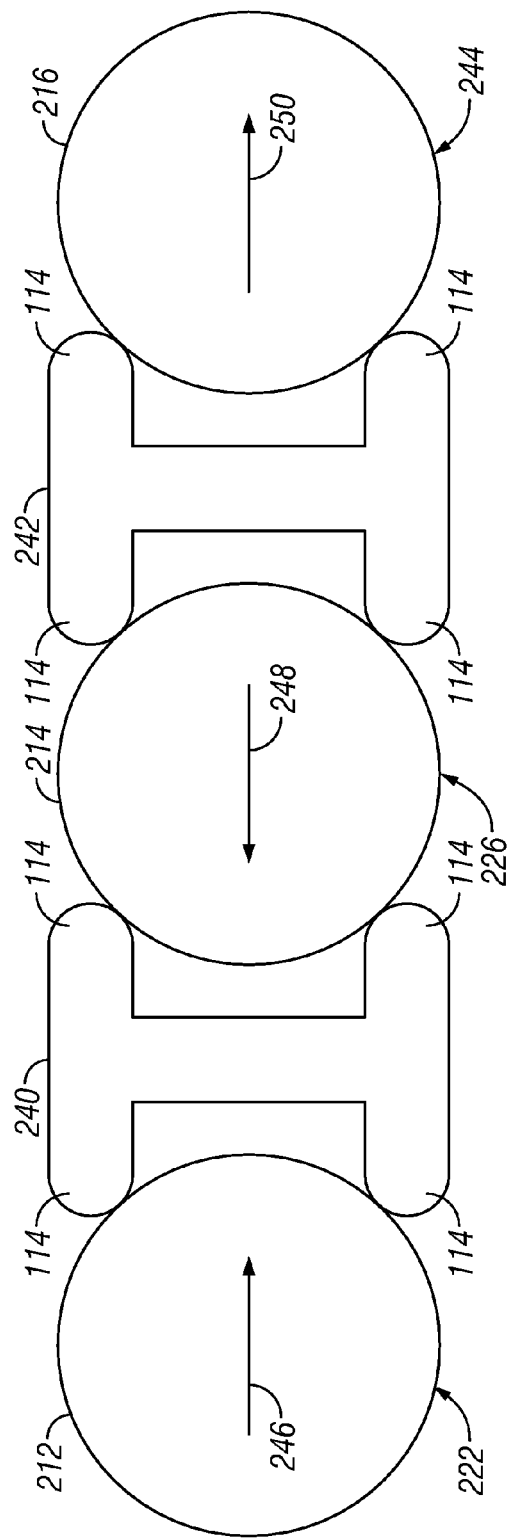
FIG. 14 is a cross-sectional view of a first optical resonator, a first photonic bandgap crystal having extensions, a second optical resonator, a second photonic bandgap crystal having extensions, and a third optical resonator in accordance with an exemplary embodiment of the present invention.

FIG. 14 is a cross-sectional view, not shown to scale, of another exemplary embodiment of the present invention taken perpendicular to the view of FIG. 13 which, similar to the exemplary embodiment of FIG. 6, shows the first and second photonic bandgap crystals 240 and 242 respectively fabricated with extensions 114 that make mechanical contact with the outside surfaces 222 and 226 of the first and second optical resonators 212 and 214, respectively, in the case of the first photonic bandgap crystal 240, and make mechanical contact with the outside surfaces 226 and 244 of the second and third optical resonators 214 and 216, respectively, in the case of the second photonic bandgap crystal 242. The extensions contact the first, second, and third optical resonators at points on their outside surfaces away from the plane in which the light propagates through the first, second, and third optical resonators as indicated by the horizontal arrows 246, 248, and 250, respectively. The mechanical interface provided by the first and second photonic bandgap crystal's extensions allows for optical systems 230 like the one illustrated in FIG. 13 where a gap 252 exists between the first photonic bandgap crystal and the first and second optical resonators and a gap between the second photonic bandgap crystal and the second and third optical resonators.

Figure 15:
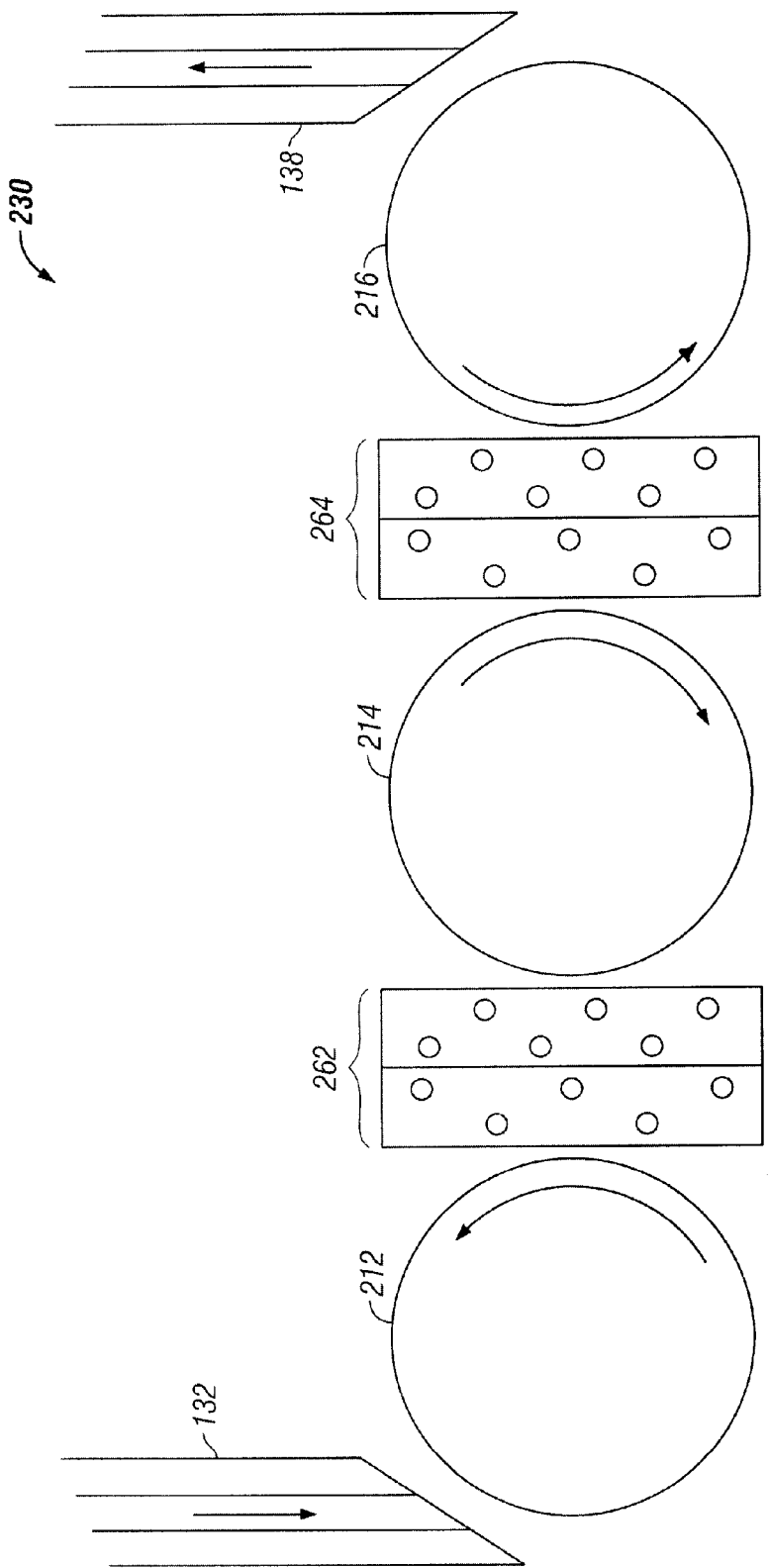
FIG. 15 is a cross-sectional view of an input optical fiber coupler, a first optical resonator, a first pair of photonic bandgap crystals, a second optical resonator, a second pair of photonic bandgap crystals, a third optical resonator, and an output optical fiber coupler in accordance with an exemplary embodiment of the present invention.

FIG. 15 is a cross-sectional view, not shown to scale, of another optical system 260 according to an exemplary embodiment of the present invention. The exemplary embodiment illustrated in FIG. 15 is similar to that of FIG. 13, however, instead of having only one photonic bandgap crystal 232 or 234 between each of the optical resonators 212, 214, and 216, there are a first and second pair of photonic bandgap crystals 262 and 264, respectively, that are placed in contact with one another as discussed in the exemplary embodiment of FIG. 11.

The mode of operation of the exemplary embodiment of FIG. 15 is similar to that of the exemplary embodiment of FIG. 13 with the following difference. Instead of the light optically tunneling through merely one photonic bandgap crystal 232 or 234, the light optically tunnels through a first and second pair of photonic bandgap crystals 262 and 264, respectively. After optically tunneling through the first pair of photonic bandgap crystals 262, the evanescent component of the light extends adjacent to the second optical resonator 214 where it is coupled into the second optical resonator. Also, after optically tunneling through the second pair of photonic bandgap crystals 264, the evanescent component of the light extends adjacent to the third optical resonator 216. Additional embodiments of the present invention, while not shown, include groupings of more than two photonic bandgap crystals.

While not shown in exemplary embodiments of FIGS. 8, 9, 11, 12, 13, and 15, embodiments of the present invention may include an input optical fiber coupler 132 having a input coupler surface 148 grated with a periodic structure (not shown) similar to the periodic structure 50 of the exemplary embodiment of FIG. 4 that extends across the exposed portion of the core 154 of the input coupler surface. The input optical fiber coupler's periodic structure would assist in the coupling of the evanescent component of light between the input optical fiber coupler and the first optical resonator 134 and 212, especially in the instance where the input optical coupler's core and the first optical resonator are made of materials having disparate indexes of refraction. Additional embodiments may include a waveguide (not shown) and/or a photonic bandgap crystal (not shown) in place of either the input optical fiber coupler 132 and/or the output optical fiber coupler 138.

Overall, the various embodiments of the present invention represent a general scheme allowing for coupling of waveguides to optical resonators, coupling of optical resonators to each other, in a practical manner that is suitable for large-scale fabrication. Significantly, the present invention provides for efficient coupling of optical systems including more than one optical resonator, and thus, allows for the realization of multi-pole high-Q filters capable of producing nearly any transfer function. The embodiments utilize linear periodic structures, for example, photonic bandgap crystals, to quasi-phase match the waveguide to the optical resonator or to quasi-phase match one optical resonator to another optical resonator.

In the embodiments, the phase matching requirements for optical coupling by means of the periodic structures including the photonic bandgap crystal are determined by calculations and modeling, thus, use of the periodic structures can be "engineered" to meet a specific design requirement. Because of the ability to engineer the periodic structures with desired parameters, the use of periodic structures, including photonic bandgap crystals, allows for the efficient coupling between waveguides and an optical resonator, and between optical resonators, having diverse geometries and optical parameters.

For example, a high Q glass optical resonator having a radius of 100 micrometers and an index of refraction of 1.46 can be optical coupled to an optical resonator, made of lithium niobate or a semiconductor, having a different radius and index of refraction. The glass optical resonator typically has a Q that is order of magnitudes larger than the Q of the lithium niobate or semiconductor optical resonators. The optical system that includes both the glass optical resonator and the semiconductor optical resonator will exhibit high Q properties, since in such an optical system, the resonance condition is determined by the optical resonator having the highest Q value. As discussed previously, light may be optically coupled into or out of the optical resonators with optical waveguides which may be coupled with a photonic bandgap crystal(s).

Numerous applications in optical signal processing, including both digital optical signal processing and analog optical signal processing, and high performance communication systems and networks that require high Q tunable, reconfigurable filters, fast switches, and high bandwidth modulators that operate at high speeds. These devices are extremely difficult to realize, especially with high Q, high speed, high power efficiency, and low insertion loss. The embodiments discusses herein satisfy such requirements.

Although exemplary embodiments of the present invention have been described, they should not be construed to limit the scope of the appended claims. Those skilled in the art will understand that various modifications may be made to the described embodiments.

For example, while the embodiments of the present invention discuss spherical optical resonators, it is to be understood that the optical resonators may be cylindrical-shaped, torodial-shaped, or may have other physical configurations. Also, while FIGS. 5, 7, 9, 11, 13, and 15 show particular configuration of holes in each the photonic bandgap crystals, the configuration can be any suitable configuration of holes.

In addition, even though the Figures only depict embodiments of the present invention where the optical resonator is physically separated from the waveguide and/or photonic bandgap crystal, the optical resonator may contact the waveguide and/or photonic bandgap crystal. In the instances where the optical resonator is physically separated from the waveguide and/or photonic bandgap crystal, the distance between the optical resonator and waveguide and/or photonic bandgap crystal may be maintained by a spacer comprised of a thin film of material, for example, FIBERCOAT QLI manufactured by Navitar Coating Labs located in Newport Beach, Calif. One side of the spacer would contact the optical resonator while the opposing side of the spacer would contact the waveguide or photonic bandgap crystal. Also, in all instances where a surface of either a waveguide, a optical fiber coupler, or an optical resonator has been grated to form a periodic structure, the periodic structure may alternatively be deposited on the surface without grating the surface using a photoresist process.

The various embodiments may include one or more optical resonators having optical characteristics that are tunable by means of varying an externally applied electrical signal, for example, an external voltage or current. Thus, embodiments may be used to implement tunable and reconfigurable multi-pole filters of RF signals carried by light. The high Q of the passive optical resonator provides correspondingly narrow spectral modes, while an active optical resonator, one in which the optical properties, for example, absorption and index of refraction change, are controlled by an externally applied electrical signal, provides for tunability of the resonant frequency of the optical system or reconfigures the spectrum of the optical resonance. If the externally applied electrical signal exceeds the value required to maintain coupling, the optical system will function as an optical switch or as an intensity or phase modulator thorough which to pass the light. The speed of such an optical switch will be limited only by the physical processes, for example, electroabsorption and electrooptic effect, which typically is extremely fast.

When two optical resonators are optically coupled to each other, second order filtering functions offer greater rejection of out-of-band spectral components. If one of the optical resonators is made of electro-optic material, spectral filtering may be adjustable by variation of an external electrical field applied to the optical resonator.

Moreover, to those skilled in the various arts, the invention itself herein will suggest solutions to other tasks and adaptations for other applications. It is therefore desired that the present embodiments be considered in all respects as illustrative and not restrictive, reference being made to the appended claims rather than the foregoing description to indicate the scope of the invention.

What is claimed is:

1. A system comprising:
a whispering gallery mode optical resonator configured to support a whispering gallery mode as a resonator mode; and
an optical waveguide spaced from the optical resonator by a gap and having a coupling surface facing the optical resonator that includes a periodic structure to form an optical grating to evanescently couple light via the periodic structure into the whispering gallery mode of the optical resonator.

2. The system according to claim 1, wherein the periodic structure is grated into the waveguide.

3. The system according to claim 1, wherein the periodic structure is deposited on the waveguide.

4. The system according to claim 1, wherein the optical resonator exhibits optical characteristics that are tunable by varying an external electric signal.

5. The system according to claim 1, wherein a shape of the optical resonator is selected from the group consisting of spherical, cylindrical, and toroidal.

6. The system according to claim 1, wherein a spacer is located between the optical resonator and the optical waveguide.

7. The system according to claim 1, wherein the optical waveguide is a fiber coupler which has an end facet forming an actuate angle with the coupling surface and facing away from the optical resonator.

8. A system comprising:
a whispering gallery mode optical resonator configured to support a whispering gallery mode as a resonator mode; and
an optical element having a periodic structure to evanescently couple light via the periodic structure into the whispering gallery mode of the optical resonator, wherein the optical element having the periodic structure is a waveguide; and
a photonic bandgap crystal positioned between the waveguide and the optical resonator for coupling of light from the waveguide, through the photonic bandgap crystal, and into the optical resonator.

9. The system according to claim 8, wherein the photonic bandgap crystal contacts the waveguide.

10. The system according to claim 8, wherein a spacer is located between the photonic bandgap crystal and the optical resonator.

11. The system according to claim 8, wherein the photonic contacts both the waveguide and the optical resonator.

12. The system according to claim 8, wherein the photonic includes extensions that contact the optical resonator.

13. The system according to claim 12, wherein the extensions provide for a gap between the photonic bandgap crystal and the optical resonator.

14. The system according to claim 8, wherein the photonic bandgap crystal comprises more than one photonic bandgap crystal.

15. The system according to claim 8, wherein the optical resonator exhibits optical characteristics that are tunable by varying an external electric signal applied to the optical resonator.

16. The system according to claim 8, wherein the photonic bandgap crystal comprises a coupling region that is separated from the optical resonator by a gap and peripheral extensions on two sides of the coupling region in contact with the optical resonator.

17. A system comprising:
a whispering gallery mode optical resonator configured to support a whispering gallery mode as a resonator mode; and
an optical element having a periodic structure to evanescently couple light via the periodic structure into the whispering gallery mode of the optical resonator, wherein the optical element is a first optical resonator and the optical resonator is a second optical resonator.

18. The system according to claim 17, further comprising an input optical coupler having an input coupler surface adjacent to the first optical resonator.

19. The system according to claim 18, wherein the input coupler surface has an input coupler surface periodic structure.

20. The system according to claim 19, wherein the input coupler is an input optical fiber coupler and the input coupler periodic structure overlaps an exposed portion of a core of the input optical fiber coupler that is included in the input optical coupler surface.

21. The system according to claim 18, wherein the input optical coupler is an input optical fiber coupler.

22. The system according to claim 17, further comprising an output optical coupler having an output coupler surface adjacent to the second optical resonator.

23. The system according to claim 22, wherein the output optical coupler is a waveguide.

24. The system according to claim 22, wherein the output optical coupler is a photonic bandgap crystal.

25. The system according to claim 17, wherein the periodic structure is grated into a surface of the first optical resonator.

26. The system according to claim 17, wherein the second optical resonator has a periodic structure.

27. The system according to claim 26, further comprising a third optical resonator located adjacent to the periodic structure of the second optical resonator.

28. The system according to claim 17, wherein one of the first and second optical resonators is made of an electro-optic material.

29. A system comprising:
a whispering gallery mode optical resonator configured to support a whispering gallery mode as a resonator mode; and
an optical element having a periodic structure to evanescently couple light via the periodic structure into the whispering gallery mode of the optical resonator, wherein the optical resonator is a second optical resonator, and the optical element having a periodic structure is a first optical resonator located adjacent to the second optical resonator, wherein the system comprises a photonic bandgap crystal positioned between the first optical resonator and the second optical resonator for coupling of light from the first optical resonator, through the photonic bandgap crystal, and into the second optical resonator.

30. The system according to claim 29, further comprising an input optical coupler having an input coupler face for coupling of light from the input optical coupler into the first optical resonator.

31. The system according to claim 30, wherein the input optical coupler is an input optical fiber coupler.

32. The system according to claim 30, wherein the input coupler face has a periodic structure.

33. The system according to claim 30, wherein the input optical coupler is a waveguide.

34. The system according to claim 30, wherein the input optical coupler is a photonic bandgap crystal.

35. The system according to claim 29, wherein the photonic bandgap crystal contacts at least one of the first optical resonator and the second optical resonator.

36. The system according to claim 29, further comprising a spacer located between the photonic bandgap crystal and at least one of the first optical resonator and the second optical resonator.

37. The system according to claim 29, wherein the photonic bandgap crystal includes extensions that contact the first optical resonator and the second optical resonator.

38. The system according to claim 37, wherein the extensions provide for a gap between the photonic bandgap crystal and the first optical resonator and the second optical resonator.

39. The system according to claim 29, wherein the photonic bandgap crystal comprises more than one photonic bandgap crystal.

40. The system according to claim 29, wherein one of the first and second optical resonators is made of an electro-optic material.

41. A system comprising:
 a first whispering gallery mode optical resonator configured to support a whispering gallery mode as a resonator mode;
 a second whispering gallery mode optical resonator separated from the first whispering gallery mode optical resonator by a gap and configured to support a whispering gallery mode as a resonator mode; and
 an optical element having a photonic bandgap material structure which includes a coupling region located in the gap and separated from the first and the second whispering gallery mode optical resonators, the coupling region configured to evanescently couple light between the first and the second whispering gallery mode optical resonators.

42. The system according to claim 41, wherein the optical element comprises peripheral extensions on two sides of the coupling region in contact with the first and the second whispering gallery mode optical resonators.

43. The system according to claim 41, wherein the optical element comprises a first photonic bandgap material and a second, different photonic bandgap material so that the light coupled between the first and the second whispering gallery mode optical resonators passes through the first and the second photonic bandgap materials.

\* \* \* \* \*